United States Patent
Woo et al.

(10) Patent No.: US 9,588,747 B2
(45) Date of Patent: Mar. 7, 2017

(54) METHOD AND APPARATUS FOR CONVERTING PROGRAMS

(71) Applicant: Samsung Electronics Co., Ltd., Suwon-si (KR)

(72) Inventors: Sang-oak Woo, Anyang-si (KR); Seok-yoon Jung, Seoul (KR); Si-hwa Lee, Seoul (KR); Igor M. Laevskiy, Saint-Petersburg (RU); Oleg V. Talalov, Saint-Petersburg (RU); Vladislav Y. Aranov, Saint-Petersburg (RU)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/204,067

(22) Filed: Mar. 11, 2014

(65) Prior Publication Data

US 2015/0095897 A1    Apr. 2, 2015

(30) Foreign Application Priority Data

Sep. 27, 2013 (KR) .................. 10-2013-0115718

(51) Int. Cl.
*G06F 9/45* (2006.01)

(52) U.S. Cl.
CPC .......... *G06F 8/4441* (2013.01); *G06F 8/4443* (2013.01)

(58) Field of Classification Search
IPC .................................................. G06F 8/4441
See application file for complete search history.

(56) References Cited

U.S. PATENT DOCUMENTS

| | | | |
|---|---|---|---|
| 5,202,995 A * | 4/1993 | O'Brien | 717/160 |
| 6,105,124 A | 8/2000 | Farber et al. | |
| 6,253,373 B1 * | 6/2001 | Peri | G06F 8/443 717/150 |

FOREIGN PATENT DOCUMENTS

| | | |
|---|---|---|
| JP | 05-027986 | 2/1993 |
| JP | 2008-015665 | 1/2008 |
| JP | 2012-174153 | 9/2012 |

OTHER PUBLICATIONS

Sungdo Moon et al., "Hyperblocking a Data Reorginization Method to Eliminate Cache Conflicts in Tiled Loop Nests", 1998, Computer Science Department University of Southern California, pp. 1-21.*

(Continued)

*Primary Examiner* — Wei Zhen
*Assistant Examiner* — Lanny Ung
(74) *Attorney, Agent, or Firm* — Harness, Dickey & Pierce, P.L.C.

(57) ABSTRACT

Methods and apparatuses of converting a program, which may enhance an execution speed of a computer program, are provided. The method may include receiving a program, detecting at least one loop statement including at least one branch statement within the program, determining whether the loop statement may be split into at one or more sub-loop statements which perform the same function as a function of the loop statement and from which the branch statement has been removed, splitting the loop statement into the sub-loop statements and removing the branch statement included in the loop statement if it is determined that the loop statement may be split as a result of the determination, and outputting a result of removing the branch statement.

18 Claims, 9 Drawing Sheets

(56) References Cited

OTHER PUBLICATIONS

Mathworks, "If statement (conditional branch in a program)", Mar. 9, 2013, http://web.archive.org/web/20130309124350/http://www.mathworks.com/help/symbolic/mupad_ref/if.html.*

* cited by examiner

```
for (i = 0; i < count;  i++)
{
        if(i % 2)
        {
                vPos[i] .x = 4;
        }
        else
        {
                vPos[i] .x = 1;
        }
}
```

FIG. 3

```
for (i = 0; i < count;  i++)
{
        if(i % getDivisor (count) )
        {
                vPos [i] . x = 4;
        }
        else
        {
                vPos [i] . x = 1;
        }
}
```

| CONDITION EXPRESSION | POSSIBLITY INFORMATION OF A SPLIT | SPLIT INFORMATION |
|---|---|---|
| (ITERATION VARIABLE, OPERATION REMAINDER, 2) | 1 | (2, INITIAL ITERATION VALUE, LAST ITERATION VALUE, 2, ITERATION VARIABLE INITIAL ITERATION VALUE +1 LAST ITERATION VALUE, 2, ITERATION VARIABLE) |
| (INCREMENT(ITERATION VARIABLE), OPERATION REMAINDER 2) | | N/A |
| ... | ... | ... |

FIG. 6

```
for (i = 0; i < count; i++)
{
        if(++i % 2)
        {
                vPos[i].x = 4;
        }
        else
        {
                vPos[i].x = 1;
        }
}
```

| CONDITION EXPRESSION | SPLIT INFORMATION |
|---|---|
| (ITERATION VARIABLE,<br>OPERATION REMAINDER,<br>2) | (2,<br>INITIAL ITERATION VALUE + 1,<br>LAST ITERATION VALUE,<br>2,<br>ITERATION VARIABLE,<br>INITIAL ITERATION VALUE,<br>LAST ITERATION VALUE,<br>2,<br>ITERATION VARIABLE) |
| ... | ... |

```
for (i = 1; i < count; i += 2)
{
        vPos [i]. x = 4;
}
for (i = 1; i < count; i += 2)
{
        vPos [i]. x = 1;
}
```

FIG. 11

```
for (i = 0; i < count; i++)
{
        int cond = ++i % 2;
        cond -= 1;
        vPos [i] . x = (4 & ~cond) | (vPos [i] . x & cond) ;
        vPos [i] . x = (vPos [i] .x & ~cond) | (1 & cond) ;
}
```

FIG. 12

METHOD AND APPARATUS FOR CONVERTING PROGRAMS

CROSS-REFERENCE TO RELATED APPLICATIONS

This application claims the priority benefit of Korean Patent Application No. 10-2013-0115718, filed on Sep. 27, 2013, in the Korean Intellectual Property Office, the disclosure of which is incorporated herein in its entirety by reference.

BACKGROUND

1. Field

Embodiments relate to methods and apparatuses for converting a program, and more particularly, to methods and apparatuses for converting a program, which may enhance an execution speed of a computer program.

2. Description of the Related Art

A computer program may be written in a programming language. The computer program may be written in a programming language. Generally, a computer program may be written in a high level language such as C language by a programmer. In order for a computer program, which is written in a high level language, to be executed in a program execution device such as a computer, the computer program may need to be converted into a low level language which may be directly understood by the computer.

The program execution device may include a processing unit. The processing unit may be one of a central processing unit (CPU), a graphics processing unit (GPU), a micro controller unit (MCU), and another similar processing unit.

The processing units may understand and execute instructions included in a specific instruction set. Hence, a computer program, which is written in a high level language, needs to be converted into a computer program which is composed of the above instructions. The program, which performs the above conversion, is generally called a compiler.

Furthermore, even if the same computer program is used, the complied result, i.e., the complied program, may be different depending on which complier has been used for conversion. Programs, which perform the same function, may have different program lengths and may include different numbers commands.

Generally, a program with a shorter execution time is considered as a superior program among one or more converted programs which perform the same function. Hence, a compiler, which may convert a computer program into a program with the shortest execution time, may be considered as the best computer program.

Furthermore, the process of converting a computer program, which is written in a high level language, into a computer program of a low level language, may include one or more operations. For example, a computer program, which is written in a high level language, may be converted into another computer program, which is written in a high level language, at least once. Furthermore, the converted computer program may be converted into a computer program, which is written in an intermediate level language, at least once. Furthermore, the converted computer program may be converted into a computer program, which is written in a low level language, at least once.

Likewise, a computer program, which is written in a high level language, may be converted into an optimized computer program with a shortest execution time by performance of one or more operations as described above.

SUMMARY

Provided are methods and apparatuses for converting a computer program, which may improve an execution speed of the computer program.

Provided are methods and apparatuses for converting a computer program into a computer program with an improved execution speed.

Provided are methods and apparatuses for converting a computer program including a branch statement into a computer program which performs the same function as that of the computer program and from which the branch statement has been removed.

Provided are methods and apparatuses for converting a loop statement including a branch statement into a loop statement which may perform the same function as that of the loop statement and from which the branch statement has been removed.

Provided are methods and apparatuses for converting a loop statement including a branch statement into one or more loop statements which may perform the same function as that of the loop statement.

Provided are methods and apparatuses for converting a computer program including a branch statement into a computer program which may perform the same function as that of the computer program and from which the branch statement has been removed.

According to an aspect of one or more embodiments, there is provided a method of converting a program which includes: receiving a program; detecting at least one loop statement including at least one branch statement within the program; determining, using at least one processor, whether the loop statement may be split into at one or more sub-loop statements which perform the same function as a function of the loop statement and from which the branch statement has been removed; splitting the loop statement into the sub-loop statements and removing the branch statement included in the loop statement if it is determined that the loop statement may be split as a result of the determination; and outputting a result of removing the branch statement.

The determining of whether the loop statement may be split may include determining that the loop statement may be split if a condition expression included in the branch statement does not change a value of an iteration variable of the loop statement.

The determining of whether the loop statement may be split may include determining that the loop statement cannot be split if a condition expression included in the branch statement changes the value of the iteration variable of the loop statement.

The determining of whether the loop statement may be split may include: searching for the condition expression included in the branch statement from a split information table; determining that the loop statement cannot be split if the condition expression does not exist in the split information table as a result of the search; receiving split possibility information corresponding to the condition expression from the split information table if the condition expression exists in the split information table as a result of the search; and determining whether the loop statement may be split using the received split possibility information.

The split information table may include at least one of the condition expression, the split possibility information corresponding to the condition expression, and split information corresponding to the condition expression.

The split information may include information on the sub-loop statement corresponding to the loop statement.

The determining of whether the loop statement may be split may include: searching for the condition expression included in the branch statement from a split information table; determining that the loop statement cannot be split if the condition expression does not exist in the split information table as a result of the search; and determining that the loop statement may be split if the condition expression exists in the split information table as a result of the search.

The split information table may include at least one of the condition expression and split information corresponding to the condition expression.

The splitting of the loop statement into the sub-loop statements and the removing of the branch statement included in the loop statement may include: receiving split information corresponding to the condition expression from the split information table; and splitting the loop statement into the sub-loop statements using the received split information, and removing the branch statement included in the loop statement.

After splitting the loop statement into the sub-loop statements and removing the branch statement included in the loop statement, the method may further include removing the branch statement included in the loop statement using a hyperblocking method if it is determined that the loop statement cannot be split as a result of the determination.

After detecting the loop statement including the branch statement, the method may further include obtaining a return value of the function if at least one function is included in a condition expression included in the branch statement included in the detected loop statement.

According to an aspect of one or more embodiments, there is provided an apparatus for converting a program which includes: a program input unit which receives a program; a program conversion unit which uses at least one processor to detect at least one loop statement including at least one branch statement within the program, determine whether the loop statement may be split into at one or more sub-loop statements which perform the same function as a function of the loop statement and from which the branch statement has been removed, and split the loop statement into the sub-loop statements and removes the branch statement included in the loop statement if it is determined that the loop statement may be split as a result of the determination; and a program output unit which outputs a result of removing the branch statement.

The program conversion unit may determine that the loop statement may be split if a condition expression included in the branch statement does not change a value of an iteration variable of the loop statement.

The program conversion unit may determine that the loop statement cannot be split if a condition expression included in the branch statement changes the value of the iteration variable of the loop statement.

The program conversion unit may search for the condition expression included in the branch statement from a split information table, determine that the loop statement cannot be split if the condition expression does not exist in the split information table as a result of the search, receive split possibility information corresponding to the condition expression from the split information table if the condition expression exists in the split information table as a result of the search, and determine whether the loop statement may be split using the received split possibility information.

The program conversion unit may search for the condition expression included in the branch statement from a split information table, determine that the loop statement cannot be split if the condition expression does not exist in the split information table as a result of the search, and determine that the loop statement may be split if the condition expression exists in the split information table as a result of the search.

The program conversion unit may receive split information corresponding to the condition expression from the split information table, split the loop statement into the sub-loop statements using the received split information, and remove the branch statement included in the loop statement.

The split information may include information on the sub-loop statements corresponding to the loop statement.

The program conversion unit may remove the branch statement included in the loop statement using a hyperblocking method if it is determined that the loop statement cannot be split as a result of the determination.

The program conversion unit may obtain a return value of the function if at least one function is included in a condition expression included in the branch statement included in the detected loop statement.

According to an aspect of one or more embodiments, there is provided at least one non-transitory computer readable medium storing computer readable instructions to implement methods of embodiments.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain examples. Expressions such as "at least one of," when preceding a list of elements, modify the entire list of elements and do not modify the individual elements of the list.

Terms such as "first" and "second" are used to describe various components, but the components are not limited by such terms. The terms are used only to distinguish one component from another.

Figure 1:
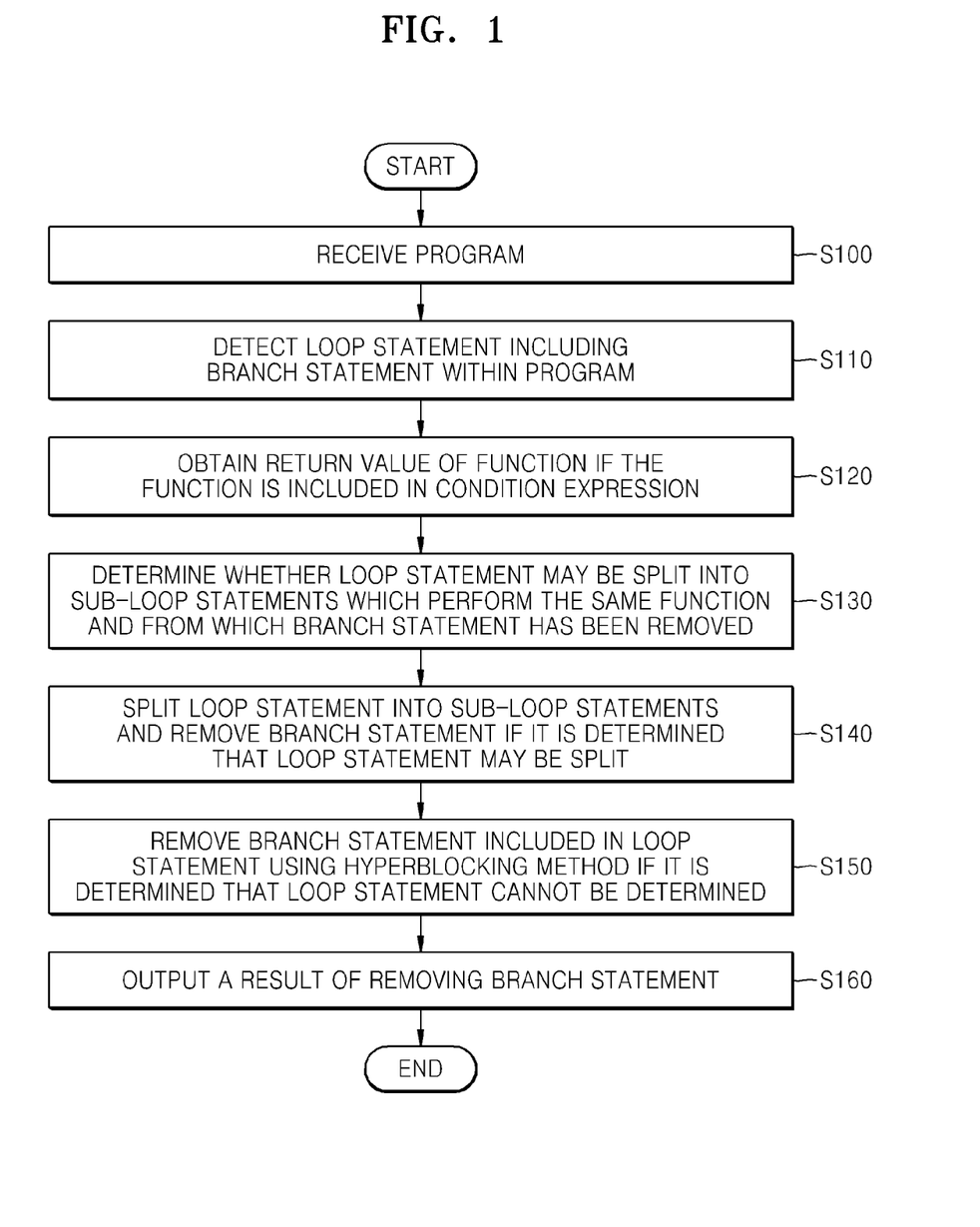
FIG. 1 is a flowchart illustrating a method of converting a program, according to an embodiment.

FIG. 1 is a flowchart illustrating a method of converting a program, according to an embodiment. Referring to FIG. 1, first, a program is received (S100). The program may be a set of instructions which may be executed in a program execution device. For example, the program may be a set of instructions which may be executed in a computer, a terminal, a server, a mobile terminal, or any other electronic device.

The computer program may be executed by a processing device included in the program execution device. The processing device may be one of a central processing unit (CPU), a graphics processing unit (GPU), a micro controller unit (MCU), and another similar processing device. More than one processing device included in the program execution device may be used to execute the computer program.

Figure 2:
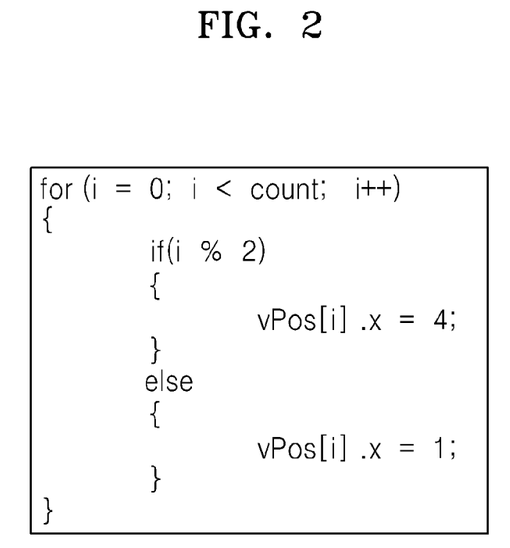
FIG. 2 is a program code illustrating content of a received program, according to an embodiment.

The program may be written in a programming language. The program may be written in a high level language such as a C language. FIG. 2 is a program code illustrating content of a received program, according to an embodiment.

The received program may include a loop statement. The received program may include a "for" loop statement or a "while" loop statement. As shown in FIG. 2, the received program may include a "for" loop statement. Furthermore, the received program may include a branch statement included in the loop statement. For example, as shown in FIG. 2, the received program may include an "if" branch statement.

Referring to FIG. 1 again, thereafter, one or more loop statements including one or more branch statements may be detected within the program (S110). For example, when a program as in FIG. 2 is received, the received program includes one "for" loop statement including one "if" branch statement, and thus the "for" loop statement may be detected.

Thereafter, when one or more functions are included in a condition expression included in the branch statement included in the detected loop statement, a return value of the function may be obtained (S120). Referring to FIG. 2, a function is not included in the condition expression "i % 2" included in the "if" branch statement.

Figure 3:
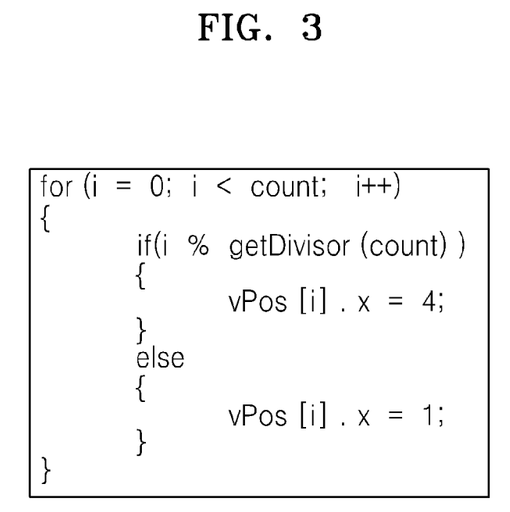
FIG. 3 is a program code illustrating content of a received program, according to another embodiment.

FIG. 3 is a program code illustrating content of a received program, according to an embodiment. Referring to FIG. 3, function "getDivisor(count)" is included in a condition expression "i % getDivisor(count)" included in the "if" branch statement. Hence, as the function "getDivisor(count)" is called, the return value of the function may be obtained. For example, when the obtained return value of the function is "2", the condition expression "i % getDivisor(count)" may be substituted as an expression such as "i % 2".

Figure 4:
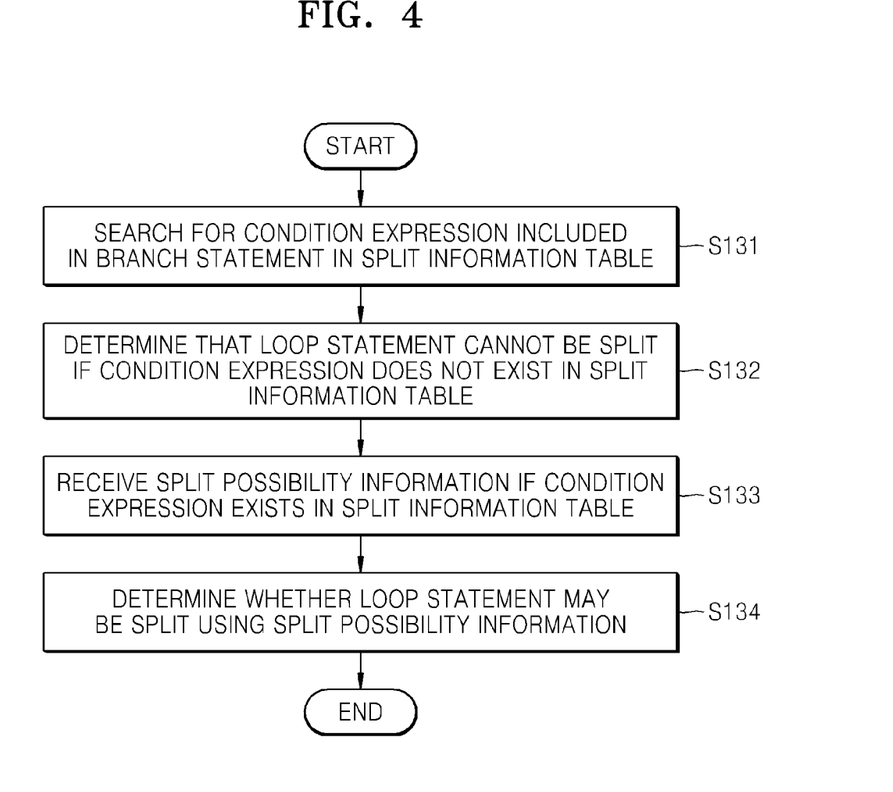
FIG. 4 is a flowchart illustrating a process of determining whether a loop statement may be split, according to an embodiment.

Referring to FIG. 1 again, thereafter, it may be determined whether the loop statement may be split into sub-loop statements which perform the same function as that of the loop statement and from which the branch statement has been removed (S130). FIG. 4 is a flowchart illustrating a process of determining whether a loop statement may be split, according to an embodiment.

Referring to FIG. 4, in order to determine whether the loop statement may be split (S130), first, the condition expression included in the branch statement may be searched for from the split information table (S131).

Figure 5:
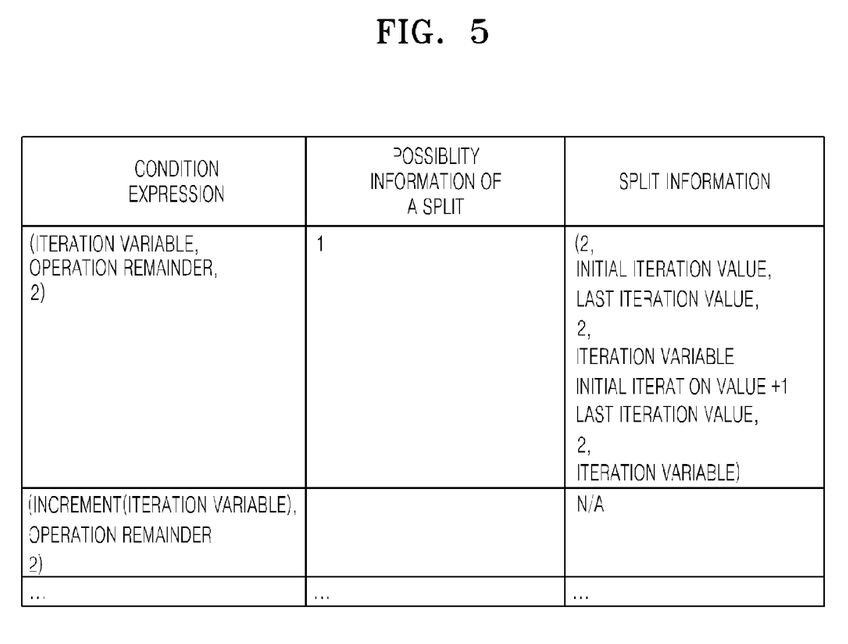
FIG. 5 is a table illustrating content of a split information table, according to an embodiment.

FIG. 5 is a table illustrating content of a split information table, according to an embodiment. Referring to FIG. 5, the split information table according to an embodiment may include three columns of a condition expression, possibility information of a split, and split information. In other words, each record included in the split information table may include three fields of the condition expression, the possibility information of a split, and the split information.

Each record included in the split information table may have been prepared in advance. When the condition expression of the branch statement included in the loop statement does not change the value of the iteration variable of the loop statement, it may be determined that the loop statement may be split, and the corresponding value may be stored in the split possibility information field and the split information field.

Furthermore, when the condition expression of the branch statement included in the loop statement changes the value of the iteration variable of the loop statement, it may be determined that the loop statement cannot be split, and the corresponding value may be stored in the split possibility information field and the split information field.

The condition expression included in the branch statement may be converted into a format which is needed for a search. For example, the expression "i % 2" may be converted into "(iteration variable, operation remainder, 2". The converted expression may be searched for from the split information table.

Figure 6:
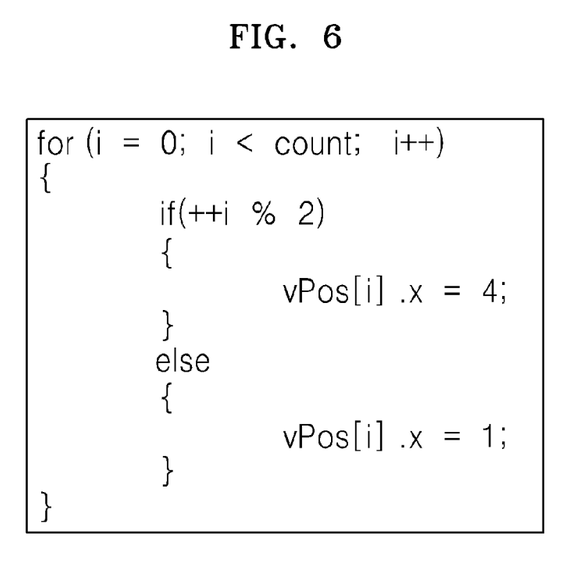
FIG. 6 is a program code illustrating content of a received program, according to another embodiment.

FIG. 6 is a program code illustrating content of a received program, according to an embodiment. Referring to FIG. 6, a condition expression "++i % 2" is included in the "if" branch statement. The expression "++i % 2" may be converted into "(increment(iteration variable), operation remainder, 2)". The converted expression may be searched for in the split information table.

Referring to FIG. 4 again, thereafter, as a result of the search, if the condition expression does not exist in the split information table, it may be determined that the loop statement cannot be split (S132).

Thereafter, as a result of the search, if the condition expression exists in the split information table, the split possibility information corresponding to the condition expression may be received from the split information table (S133). For example, referring to FIG. 5, the converted expression "(iteration variable, operation remainder, 2)" may exist in the split information table. Hence, the value "1" of the split possibility information field may be received in the record corresponding to the converted expression.

Furthermore, referring to FIG. 5, the converted operation "(increment(iteration variable), operation remainder, 2)" may exist in the split information table. Hence, the value "0" of the split possibility information field may be received in the record corresponding to the converted operation.

Referring to FIG. 4 again, thereafter, it may be determined whether the loop statement may be split using the received split possibility information (S134). For example, if "1" is received as the received split possibility information, it may be determined that the split information may be split. Hence, it may be determined that the loop statement included in the program of FIG. 2 may be split.

Furthermore, if "0" is received as the received split possibility information, it may be determined that the loop statement cannot be split. Hence, it may be determined that the loop statement included in the program of FIG. 6 cannot be split.

Figure 7:
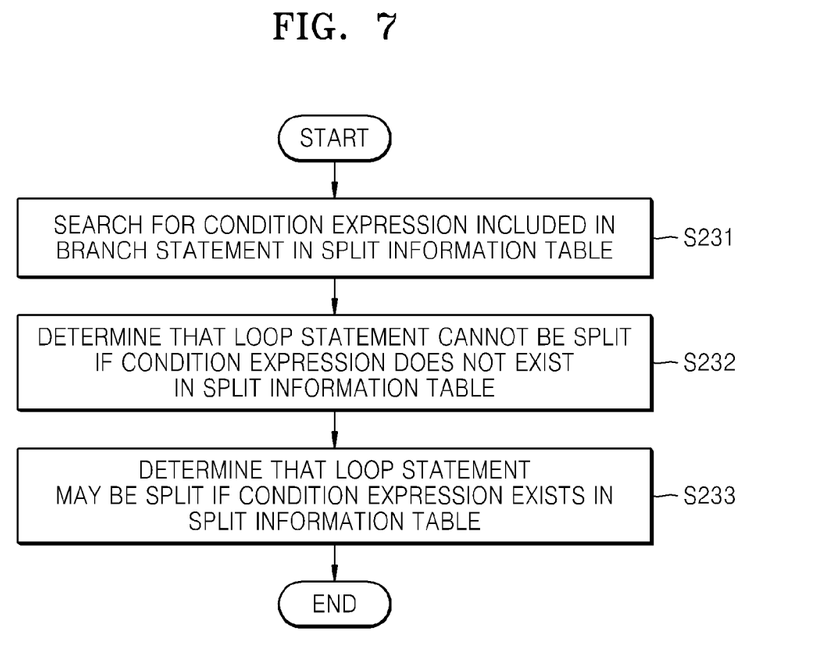
FIG. 7 is a flowchart illustrating a process of determining whether a loop statement may be split, according to an embodiment.

FIG. 7 is a flowchart illustrating a process of determining whether a loop statement may be split, according to an embodiment.

Referring to FIG. 7, in order to determine whether the loop statement may be split, first, the condition expression included in the branch statement may be searched for from the split information table (S231).

Figure 8:
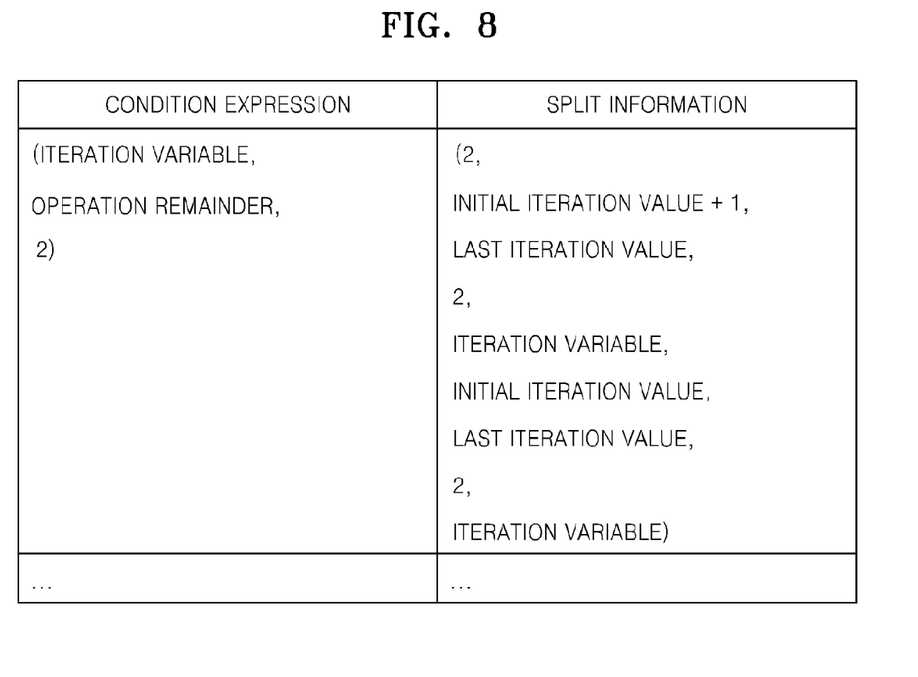
FIG. 8 is a table illustrating content of a split information table, according to another embodiment.

FIG. 8 is a table illustrating content of a split information table, according to an embodiment. Referring to FIG. 8, the split information table according to an embodiment may include two columns of a condition expression and split information. In other words, each record included in the split information table may include two fields of the condition expression and the split information.

The condition expression included in the branch statement may be converted into a format which is needed for a search. For example, the expression "i % 2" may be converted into "(iteration variable, operation remainder, 2)". The converted expression may be searched for from the split information table. Furthermore, the expression "++i % 2" may be converted into "(increment(iteration variable), operation remainder, 2)". The converted expression may be searched for from the split information table.

Referring to FIG. 7 again, thereafter, as a result of the search, if the condition expression does not exist in the split information table, it may be determined that the loop statement cannot be split (S232). For example, referring to FIG. 8, the converted expression "(increment(iteration variable), operation remainder, 2)" may not exist in the split information table. Hence, it may be determined that the loop statement included in the program of FIG. 6 cannot be split.

Thereafter, as a result of the search, if the condition expression exist in the split information table, it may be determined that the loop statement may be split (S233). For example, referring to FIG. 8, the converted expression "(iteration variable, operation remainder, 2)" may exist in the split information table. Hence, it may be determined that the loop statement included in the program of FIG. 2 may be split.

Figure 9:
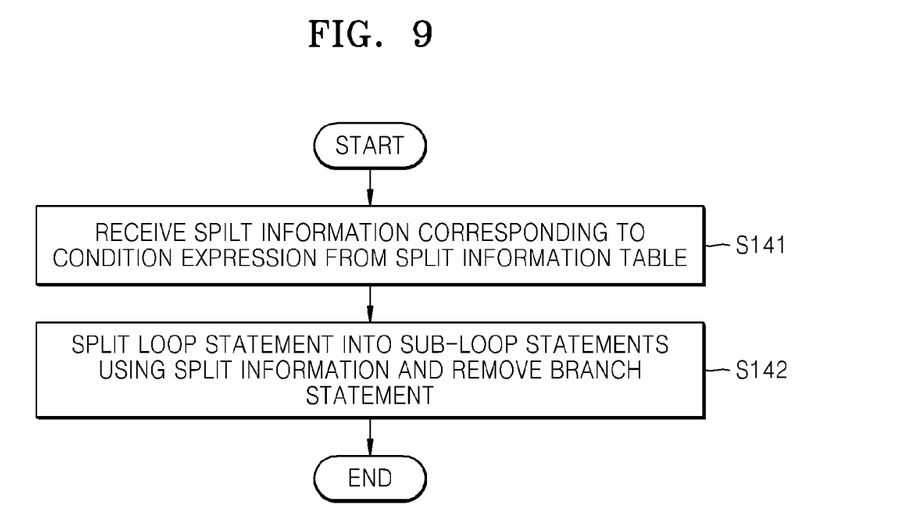
FIG. 9 is a flowchart illustrating a process of removing a branch stated included in a program and splitting a loop state.

Referring to FIG. 1 again, thereafter, as a result of the determination, if it is determined that the loop statement may be split, the loop statement may be split into the sub-loop statements, and the branch statement included in the loop statement may be removed (S140). FIG. 9 is a flowchart illustrating a process (S140) of removing a branch stated included in a program and splitting a loop state.

Referring to FIG. 9, in order to remove the branch statement included in the loop statement and split the loop statement, first, the split information corresponding to the condition expression may be received from the split information table (S141). For example, referring to FIG. 5, the split information "(2, initial iteration value+1, last iteration value, 2, iteration variable, initial iteration value, last iteration value, 2, iteration variable)" corresponding to the converted expression "(iteration variable, operation remainder, 2)" may be received.

The split information may include, for example, the number of sub-loop statements, an initial iteration value of a first sub-loop statement, the last iteration value of the first sub-loop statement, an increment value of the iteration value of the first sub-loop statement, an iteration variable referenced within the first sub-loop statement, the initial iteration value of a second sub-loop statement, the last iteration value of the second sub-loop statement, an increment value of the iteration value of the second sub-loop statement, and an iteration variable referenced within the second sub-loop statement.

Thereafter, the iteration statement may be split into the sub-loop statements using the received split information, and the branch statement included in the loop statement may be removed (S142). For example, it is assumed that the split information "(2, initial iteration value+1, last iteration value, 2, iteration variable, initial iteration value, last iteration value, 2, iteration variable)" is received. The branch statement included in the loop statement included in the program of FIG. 2 may be removed using the split information, and the loop statement may be split into the sub-loop statements.

Referring to the split information, the loop statement may be split into two sub-loop statements of the first sub-loop statement and the second sub-loop statement. The initial iteration value of the first sub-loop statement may be designated as a number which is larger than the initial iteration value of the original loop statement by 1. The last loop value of the first sub-loop statement may be designated as the same number as the last iteration value of the original loop statement. The increment value of the first sub-loop statement may be designated as 2. The iteration variable referenced within the first sub-loop statement may be designated as the same variable as the iteration variable of the original loop statement.

Furthermore, referring to the split information, the initial iteration variable of the second sub-loop statement may be designated as the same number as the initial iteration value of the original loop statement. The last iteration variable of the second sub-loop statement may be designated as the same number as the last iteration value of the original loop statement. The increment value of the iteration value of the second sub-loop statement may be designated as 2. The iteration variable referenced within the second sub-loop statement may be designated as the same variable as the iteration variable of the original loop statement.

Figure 10:
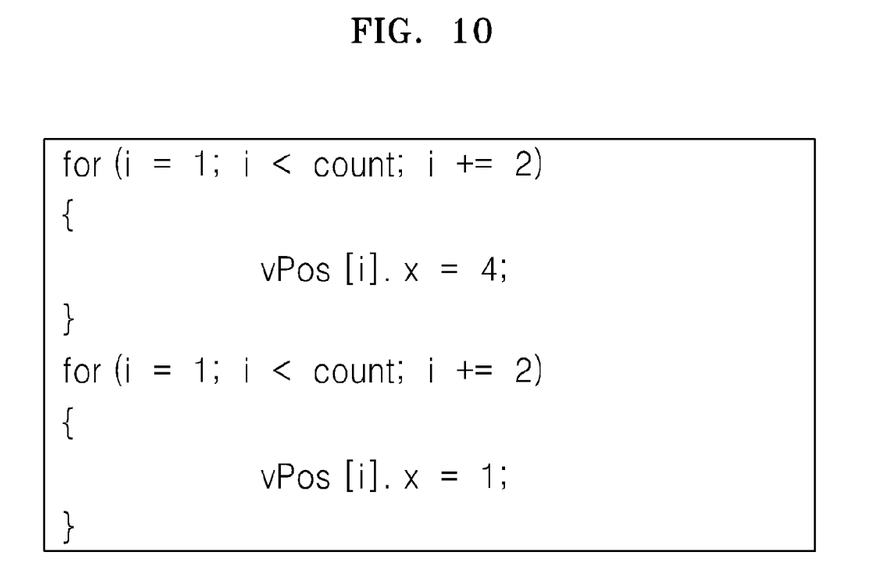
FIG. 10 is a program code illustrating a result of removing a branch statement included in a program and splitting a loop state, according to an embodiment.

FIG. 10 is a program code illustrating a result of removing a branch statement included in a program and splitting a loop state, according to an embodiment.

Figure 11:
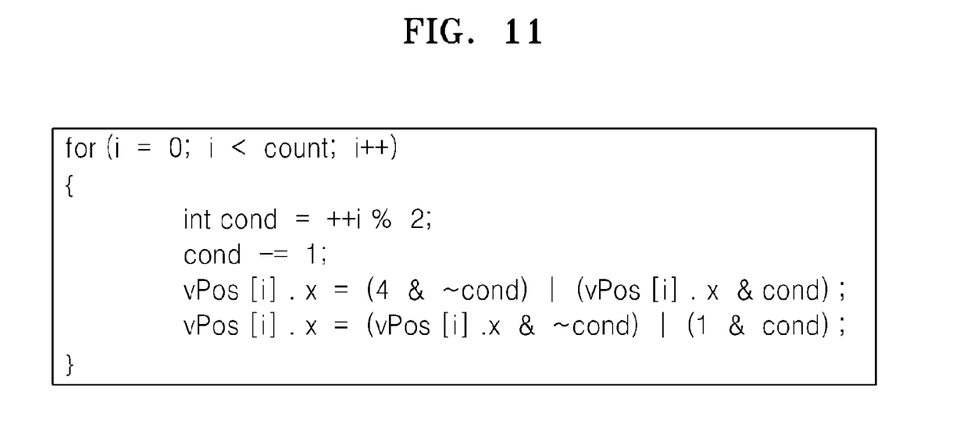
FIG. 11 is a program code illustrating a result of removing a branch state included in a program using a hyperblocking method, according to an embodiment.

Referring to FIG. 1 again, thereafter, as a result of the determination, when it is determined that the loop statement cannot be split, the branch statement included in the loop statement may be removed using a hyperblocking method (S150). FIG. 11 is a program code illustrating a result of removing a branch state included in a program using a hyperblocking method, according to an embodiment.

Referring to FIG. 1 again, thereafter, the result of removing the branch statement may be output (S160).

According to the method of converting a program of one or more embodiments, a computer program including a branch statement may be converted into a computer program which performs the same function as that of the computer program and from which the branch statement has been removed.

The apparatus for executing a program may generally execute branch instructions. However, the execution speed of the branch instruction is relatively low compared to other types of instructions, and thus the execution time of the computer program including the branch statement may be longer than the execution time of non-branch instructions which perform the same function as that of the computer program. Hence, the execution time of the computer program, from which the branch statement included in the computer program has been removed, may be shorter than the execution time of the original computer program, depending on the method of converting the program according to an embodiment.

Furthermore, according to one or more of above-described embodiments, when it is determined that a loop statement may be split, the loop statement may be split into one or more sub-loop statements, and when it is determined that the loop statement cannot be split, a hyperblocking method may be used. Furthermore, the execution time of the computer program, from which the branch statement included in the computer program has been removed using only the hyperblocking method, may be longer than the execution time of the computer program which has been converted according to an embodiment. This is because, when the hyperblocking method is used, both the command corresponding to when the condition expression is true and the command corresponding to when the condition expression is false are executed regardless of whether the condition expression of the branch statement is true or false.

Furthermore, according to one or more of above-described embodiments, the program may be relatively quickly converted compared to when the branch statement included in the computer program is removed using only the hyperblocking method. This is because the execution time of the operation (S140) of splitting the loop statement into one or more sub-loop statements is shorter than the execution time of the operation (S150) of removing the branch statement included in the loop statement using the hyperblocking method.

Figure 12:
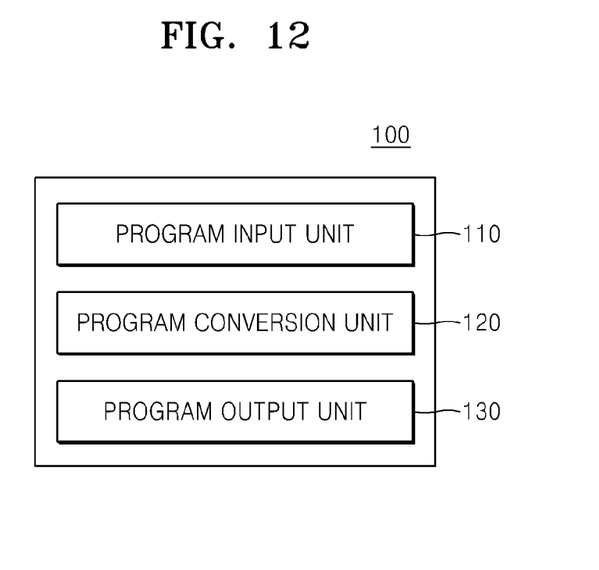
FIG. 12 is a block diagram illustrating a configuration of an apparatus for converting a program, according to an embodiment.

FIG. 12 is a block diagram illustrating a configuration of an apparatus 100 for converting a program, according to an embodiment. Referring to FIG. 12, the apparatus 100 for converting the program may include a program input unit 110, a program conversion unit 120, and a program output unit 130.

Examples of a program conversion unit 120 may be a processing device included in the program execution device. The processing device may be one of a central processing unit (CPU), a graphics processing unit (GPU), a micro controller unit (MCU), and another similar processing device. More than one processing device included in the program execution device may be used to execute the computer program. One or more of these processing devices may also be a program input unit 110 and one or more of these processing devices may be a program output unit. However, the program input unit 110, the program conversion unit 120, and program output unit 120 are not limited to these examples.

The program input unit 110 may receive a program. The program input unit 110 may externally receive the program or may receive the program from the program output unit 130 of another apparatus 100 for converting a program. The program input unit 110 has been described in detail in the operation (S100) of receiving a program, and thus the detailed description is omitted here.

The program conversion unit 120 may detect one or more loop statements including one or more branch statements within the program. Furthermore, the program conversion unit 120 may obtain the return value of the function if one or more functions are included in the condition expression included in the branch statement included in the detected loop statement. Furthermore, the program conversion unit 120 may determine whether the loop statement may be split into one or more sub-loop statements which perform the same function as that of the loop statement and from which the branch statement has been removed.

Furthermore, when it is determined that the loop statement may be split as a result of the determination, the program conversion unit 120 may split the loop statement into the sub-loop statements and remove the branch statement included in the loop statement. Furthermore, when it is determined that the loop statement cannot be split as a result of the determination, the program conversion unit 120 may remove the branch statement included in the loop statement using the hyperblocking method.

The program conversion unit 120 has been described above in detail with reference to the operation (S110) of detecting the loop statement including the branch statement to the operation (S150) of removing the branch statement included in the branch statement using the hyperblocking method, and the detailed description thereof is omitted here.

The program output unit 130 may output a result of removing the branch statement. The program output unit 130 has been described above in detail with reference to the above operation (S160) of outputting a result of removing the branch statement, and thus the detailed description thereof is omitted here.

As described above, according to the one or more of the above embodiments, an execution speed of a computer program may be improved.

According to the one or more embodiments, a computer program may be converted into a computer program with an improved execution speed.

According to the one or more embodiments, a computer program including a branch statement may be converted into a computer program which performs the same function as that of the computer program and from which the branch statement has been removed.

According to the one or more embodiments, a loop statement including a branch statement may be converted into a loop statement which may perform the same function as that of the loop statement and from which the branch statement has been removed.

According to the one or more embodiments, a loop statement including a branch statement may be converted into one or more loop statements which may perform the same function as that of the loop statement.

According to the one or more embodiments, a computer program including a branch statement may be converted into a computer program which may perform the same function as that of the computer program and from which the branch statement has been removed.

Processes, functions, methods, and/or software in apparatuses described herein may be recorded, stored, or fixed in one or more non-transitory computer-readable storage media (computer readable recording medium) that includes program instructions (computer readable instructions) to be implemented by a processing device to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among hardware devices so that computer-readable codes or program instructions may be stored and executed in a decentralized manner. In addition, the computer-readable storage media may also be embodied in at least one application specific integrated circuit (ASIC) or Field Programmable Gate Array (FPGA).

It should be understood that embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims and equivalents.

What is claimed is:

1. A method of converting a program comprising:
   receiving a program;
   detecting at least one loop statement including a branch statement within the program;
   searching for a condition expression included in the branch statement from a split information table;
   receiving split possibility information corresponding to the condition expression from the split information table when the condition expression exists in the split information table;
   determining whether the loop statement splits into sub-loop statements which perform the same function as a function of the loop statement and among which the branch statement has been removed so as to exclude any branch statement therein;
   splitting the loop statement into the sub-loop statements and removing the branch statement when it is determined that the loop statement splits; and
   outputting a result of removing the branch statement,
   wherein the determining of whether the loop statement splits comprises:
   determining that the loop statement cannot split when the condition expression does not exist in the split information table; and
   determining, by using the received split possibility information, whether the loop statement splits.

2. The method of claim 1, wherein the determining whether the loop statement splits comprises determining if a condition expression included in the branch statement does not change a value of an iteration variable of the loop statement.

3. The method of claim 1, wherein the determining whether the loop statement splits comprises determining if a condition expression included in the branch statement changes the value of the iteration variable of the loop statement.

4. The method of claim 1, wherein the split information table includes at least one of the condition expression, the split possibility information corresponding to the condition expression, and split information corresponding to the condition expression.

5. The method of claim 4, wherein the split information includes information of the sub-loop statements.

6. The method of claim 1, wherein the determining whether the loop statement splits comprises
   determining that the loop statement splits when the condition expression exists in the split information table.

7. The method of claim 6, wherein the split information table includes at least one of the condition expression and split information corresponding to the condition expression.

8. The method of claim 1, wherein the splitting of the loop statement into the sub-loop statements and the removing of the branch statement included in the loop statement comprise:
   splitting the loop statement into the sub-loop statements based on the received split information; and
   removing the branch statement included in the loop statement.

9. The method of claim 1, wherein, after splitting the loop statement into the sub-loop statements and removing the branch statement included in the loop statement, further comprising:
   removing the branch statement included in the loop statement using a hyperblocking method if it is determined that the loop statement cannot split.

10. The method of claim 1, where, after detecting the loop statement including the branch statement, further comprising:
    obtaining a return value of the function if a function is included in a condition expression included in the branch statement.

11. An apparatus for converting a program, the apparatus comprising:
    a program receiver implemented by a processor and configured to receive a program;
    a program converter implemented by the processor and configured to detect a loop statement including a branch statement within the program, determine whether the loop statement splits into sub-loop statements which perform the same function as a function of the loop statement and among which the branch statement has been removed so as to exclude any branch statement therein, and split the loop statement into the sub-loop statements and remove the branch statement included in the loop statement when it is determined that the loop statement splits; and
    a program transmitter implemented by the processor and configured to output a result of removing the branch statement,
    wherein the program converter searches for a condition expression included in the branch statement from a split information table, determines that the loop statement cannot split when the condition expression does not exist in the split information table, receives the split possibility information corresponding to the condition expression when the condition expression exists in the split information table, and determines whether the loop statement splits based on the received split possibility information.

12. The apparatus of claim 11, wherein the program converter determines that the loop statement splits if a condition expression included in the branch statement does not change a value of an iteration variable of the loop statement.

13. The apparatus of claim 11, wherein the program converter determines that the loop statement cannot split if a condition expression included in the branch statement changes the value of the iteration variable of the loop statement.

14. The apparatus of claim 11, wherein the program converter determines that the loop statement splits when the condition expression exists in the split information table.

15. The apparatus of claim 11, wherein the program converter splits the loop statement into the sub-loop statements based on the received split information, and removes the branch statement.

16. The apparatus of claim 15, wherein the received split information includes information of the sub-loop statements.

17. The apparatus of claim 11, wherein the program converter removes the branch statement included in the loop statement using a hyperblocking method if it is determined that the loop statement cannot split.

18. A non-transitory computer readable medium storing computer readable instructions that when executed control a processor to execute the method of claim 1.

\* \* \* \* \*